E. J. M. MADERO.
ROTARY ENGINE.
APPLICATION FILED JAN. 26, 1917.

1,266,605.

Patented May 21, 1918.
2 SHEETS—SHEET 1.

Inventor
Eduardo Jose Maria Madero
By his Attorney

E. J. M. MADERO.
ROTARY ENGINE.
APPLICATION FILED JAN. 26, 1917.
1,266,605.
Patented May 21, 1918.
2 SHEETS—SHEET 2.
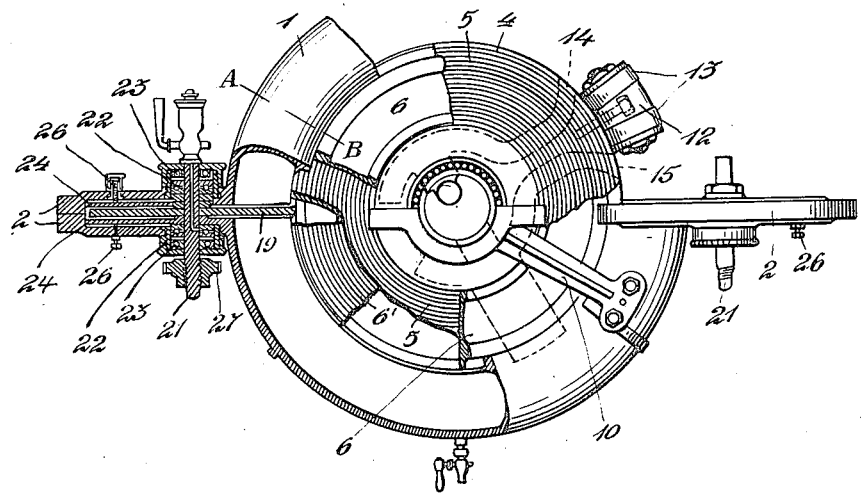
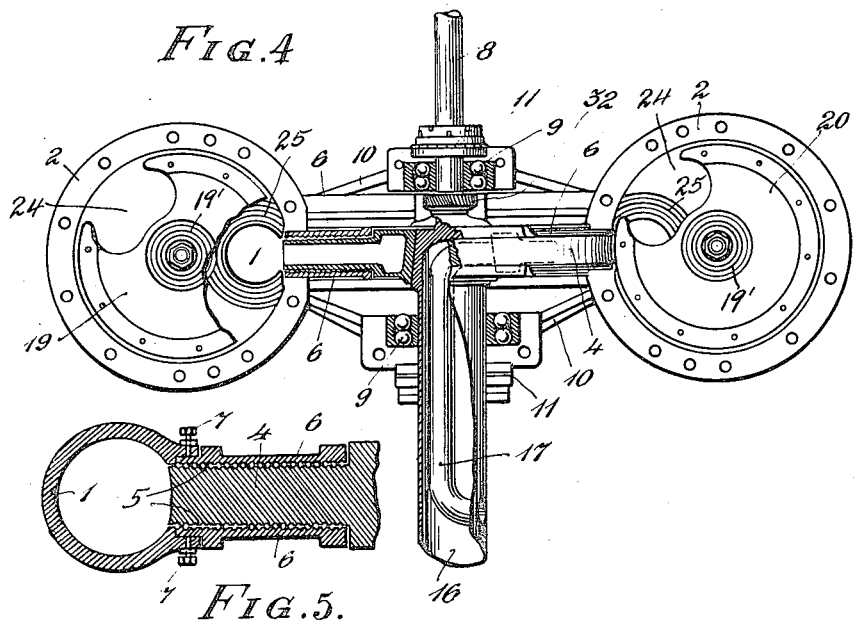
Inventor
Eduardo Jose Maria Madero
By his Attorney.

UNITED STATES PATENT OFFICE.

EDUARDO JOSE MARIA MADERO, OF BUENOS AIRES, ARGENTINA.

ROTARY ENGINE.

1,266,605.

Specification of Letters Patent. Patented May 21, 1918.

Application filed January 26, 1917. Serial No. 144,684.

*To all whom it may concern:*

Be it known that I, EDUARDO JOSE MARIA MADERO, a citizen of the Argentine Republic, residing at Buenos Aires, Argentina, have invented new and useful Improvements in Rotary Engines, of which the following is a specification.

The invention consists in constructing an annular piston-cylinder of two semi-circular bodies connected at their ends by two transversely arranged circular, dished plates, each pair of opposed plates forming a chamber intersecting the cylinder at diametrically opposite points of the latter. An obturating disk or valve is rotatably mounted in each chamber and suitable gearing, actuated by the movement of the piston in the cylinder, is provided for simultaneously rotating the disks, whereby a solid part of one disk and a cutaway portion of the other disk will be moved into position to close the cylinder behind the piston and open it in front of the same.

The piston is carried by a fly wheel, the periphery of which constitutes a section of the cylinder, and the admission and exhaust passages for the driving medium are located within the fly wheel and open into the cylinder in close proximity to both ends of the piston.

Both faces of the obturating disks and of the fly wheel are formed with a series of circumferential grooves which register with sets of similar grooves in the plates forming the chambers and in covers arranged on both sides of the fly wheel, whereby a certain amount of steam is condensed within said grooves and operates to effect a tight fitting of the parts without loss of energy by friction.

For the ready understanding of this description, illustrative drawings have been annexed thereto, in which:

Fig. 3 illustrates an elevation of the engine, partly in section.

Fig. 4 shows a top plan view of the same, parts being in section.

Fig. 5 represents a sectional view, on the line A—B of Fig. 3, of the combination of the adjusting plates or covers with the driving wheel and the circular chamber or casing.

Figure 1:
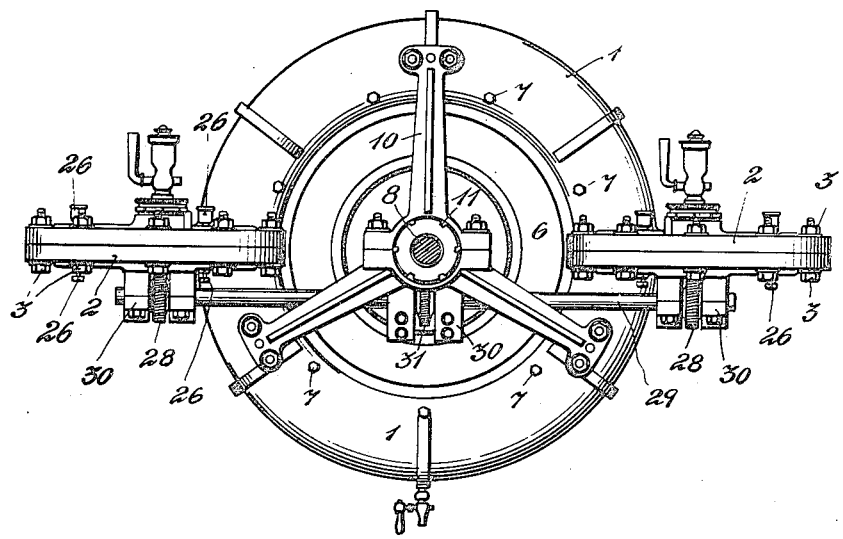
Figure 1 represents a front elevation of a rotary engine constructed in accordance with my invention.
Figure 2:
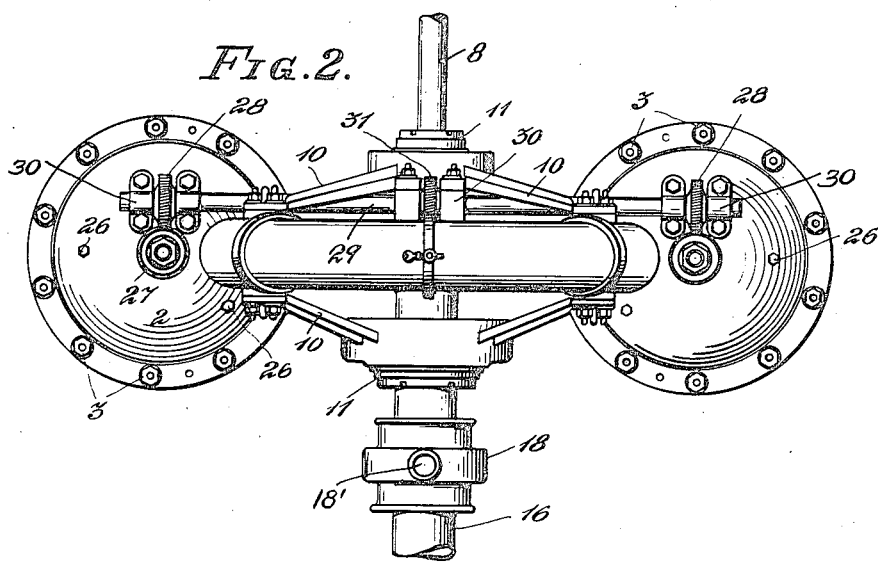
Fig. 2 shows a plan view of the same engine.

In said drawings, 1 indicates the hollow semi-circular parts or bodies at whose points of connection are formed the plates 2 and which after being connected together by means of bolts 3, form the circular casing of the annular piston-cylinder and valve chambers.

Said casing has an annular opening, covered by the periphery of the flier or driving wheel 4, provided with grooves according to the diameter of the obturating disks hereinafter described. The sides of said wheel are formed with a series of circumferential grooves 5 arranged to register with other sets of grooves 6', formed in similar number and diameter, on the internal faces of the adjusting plates 6.

These latter plates are provided on their peripheries and on their stepped parts of less diameter, with two grooves, filled with any suitable packing material in order to obtain a perfectly tight fitting between said plates and the casing. According to this arrangement, the casing itself and the lateral plates or covers form with regard to the fly-wheel, a casing of which the adjustment may be regulated by means of the lateral screws 7 by which the said plates may be moved to the desired extent.

In order to maintain the driving wheel in a concentric position with regard to the casing, radial arms 10 are employed, mounted at both sides and constructed of two detachable parts, arranged in such a manner as to render their position unalterable. At the point where said arms meet, are inserted the bearings 9.

The bearings 9 are of the common steel ball bearing type and support the axle in combination with the bearings 11 which allow of regulating the axial position of the fly-wheel with regard to the casing.

On the periphery of the fly-wheel 4 is conveniently secured the plunger 12 which carries two packing rings 13 of a width somewhat greater than the thickness of the obturating disks.

By referring to Fig. 3, it will be seen that on both sides of the plunger open the pipes 14, 15 which pass through the interior of the fly-wheel and are alternately employed for the admission and exhaust of energy, according to the direction given to the circulation in order to cause the engine to run in one direction or the other. Said pipes or ducts respectively communicate with the hollow axle 16 and with the pipe 17 which passes through the interior of the same. In the present case, the said axle 16 is shown as exhausting into the air while the pipe 17 applies its orifice to the periphery of the axle, being combined with a sleeve 18 to which is connected the steam pipe (not shown). Said sleeve allows of the entrance of steam every time the orifice of the pipe 17 registers with the inlet 18' in the sleeve, to which end the admission must be combined with the movement of the plunger.

The plates or covers 2, when connected together, form chambers in which are placed and move the obturating disks 19 and 20. These disks, diametrically arranged one at each side of the casing, are secured to the respective axles 21, mounted at both ends in pairs of steel ball bearings 22 and 23, operating respectively in a longitudinal and transverse sense with regard to the axle.

At each side of the disk is mounted a plate 24, on the internal face of which are formed circular grooves 25 eccentric to the axle of the disk and coöperating with grooves 19' on the disk concentric to the axle which assist in obtaining a better fitting with the disk. Said plates are caused to approach the obturating disk by means of the screws 26, so that the adjustment or fitting between both parts may be carried out to the desired extent.

As has already been stated when describing the plates or covers 6, the condensation of steam within the circular grooves permits of a perfectly tight fitting being obtained without any friction being caused between the surfaces.

Each axle 21 carries a helicoidal toothed wheel 27 which meshes with another similar wheel 28, keyed to the axle 29, maintained in position by the bearings 30 and driven by the helicoidal gear wheel 31 which meshes with another similar wheel 32, of same diameter and keyed to the main axle 8.

Owing to this arrangement, the number of turns performed by the plunger is exactly the same as that effected by the obturating disks.

The combination of motion between the plunger and the disks is such that in whatever direction the engine be running, at the moment in which the plunger is about to pass by the point where one of the disks is placed, this latter will present its cut away part to the annular chamber of the casing and thereby permit of the passage of the plunger, while the opposite disk will keep the annular chamber closed till in its turn, it is obliged to clear the latter.

The operation of the engine is as follows:

Supposing the plunger to be in any position, as for instance that shown in Fig. 3, at the moment of admitting steam by the pipe 17, the same will pass through the passage or duct 14 and will operate by expansion between the obturating disk 19 and the corresponding face of the plunger. When this latter has passed by the disk 20, the steam will operate between this latter and the same face of the plunger, while exhaust is constantly taking place on the opposite side, through the pipe 15 and the hollow axle 16.

By reversing the circulation in said ducts or passages, the direction of running of the engine is also reversed.

Owing to the manner of combining the movement of the obturating disks with that of the plunger and to the fact that in this latter, the point of initiation of said movement is, on one side, the admission of steam, and on the other, the exhaust, no dead point occurs in the operation of the engine, whichever be the position in which the engine is started, in one or the other direction. It will further be evident that as all movements of the engine are rotary, the same may be run at low or high speed without causing vibration and without any of its operative parts being liable to fracture, such as high speed will cause in ordinary engines.

As has already been stated before, the motive power developed by the engine is constant through the entire stroke or revolution of the plunger if the admission of energy is effected without interruption, but if the engine be desired to operate partly by energy and partly by expansion of the same, it will be necessary to obturate the admission port at the required or suitable instant, which may readily be obtained by any suitable valve arrangement, as has been described before or by means of any other convenient type.

Steam pressure or fluid pressure obtained by the combustion of gases may as well be employed for conveniently operating the engine.

Having now particularly described and ascertained the nature of my said invention and in which manner the same is to be performed, I declare that what I claim, is:

1. In a rotary engine, an annular piston-cylinder comprising two semi-circular bodies having transversely arranged dished plates on their ends forming valve chambers, a fly-wheel mounted concentrically to the cylinder and forming a section of the periphery of the latter, a piston mounted on the periphery of the fly-wheel within said cylinder, and adjustable tightening plates covering the sides of the wheel.

2. In a rotary engine, an annular piston-cylinder comprising two semi-circular bodies having transversely arranged dished plates on their ends forming valve chambers, a fly-wheel mounted concentrically to the cylinder and forming a section of the periphery of the latter, a piston mounted on the periphery of the fly-wheel within said cylinder, adjustable tightening plates covering the sides of the wheel, and admission and exhaust passages in the fly-wheel opening into the cylinder on both sides of the piston in close proximity to the latter.

3. In a rotary engine, an annular piston-cylinder, a fly-wheel forming a section of the periphery of the cylinder, a piston mounted on the periphery of the wheel within the cylinder, and adjustable tightening plates mounted on each side of the wheel and having grooves formed on their inner faces concentric to the axis of the fly wheel.

4. In a rotary engine, an annular piston-cylinder, a fly-wheel forming a section of the periphery of the cylinder, a piston mounted on the periphery of the wheel within the cylinder, and adjustable tightening plates mounted on each side of the wheel and having grooves formed on their inner faces concentric to the axis of the fly-wheel, said grooves coöperating with grooves formed on the sides of said wheel.

5. In a rotary engine, an annular piston-cylinder comprising two semi-circular bodies having transverse dished circular plates forming valve chambers, a fly-wheel forming a section of the periphery of the cylinder, a piston mounted on the periphery of the wheel within the cylinder, and adjustable tightening plates mounted on each side of the wheel and having grooves formed on their inner faces concentric to the axis of the fly wheel, said grooves coöperating with grooves formed on the side of said wheel.

6. In a rotary engine, an annular piston-cylinder comprising two semi-circular bodies having transverse dished circular plates forming valve chambers, a fly-wheel forming a section of the periphery of the cylinder, a piston mounted on the periphery of the wheel within the cylinder, plates mounted on each side of the wheel and having grooves formed on their inner faces concentric to the axis of the fly-wheel, said grooves coöperating with grooves formed on the sides of said wheel, obturating disks rotatable in said chambers having a plurality of grooves in their sides, and plates on opposite sides of the disks having grooves coöperating with the grooves in said disks.

7. In a rotary engine, an annular piston-cylinder comprising two semi-circular bodies having transverse circular dished plates forming valve chambers, a fly wheel forming a section of the periphery of the cylinder, a piston mounted on the periphery of the wheel within the cylinder, obturating disks mounted in said chambers having a plurality of grooves in their sides concentric to the axes of the disks, and plates on opposite sides of the disks having grooves formed therein eccentric to said axes and coöperating with the grooves in said disks.

8. In a rotary engine, an annular piston-cylinder comprising two semi-circular bodies having transverse circular dished plates forming valve chambers, a fly wheel forming a section of the periphery of the cylinder, a piston mounted on the periphery of the wheel within the cylinder, obturating disks mounted in said chambers having a plurality of grooves in their sides concentric to the axes of the disks, and adjustable plates on opposite sides of the disks having grooves formed therein eccentric to said axes and coöperating with the grooves in said disks.

9. In a rotary engine, an annular piston-cylinder comprising two semi-circular bodies having transverse dished circular plates forming valve chambers, a fly-wheel forming a section of the periphery of the cylinder, a piston mounted on the periphery of the wheel within the cylinder, plates mounted on each side of the wheel and having grooves formed on their inner faces concentric to the axis of the fly wheel, said grooves coöperating with grooves formed on the sides of said wheel, obturating disks mounted in said chambers having a plurality of grooves in their sides concentric to the axes of the disks, and adjustable plates on opposite sides of the disks having grooves formed therein eccentric to said axes and coöperating with the grooves in said disks.

EDUARDO JOSE MARIA MADERO.

Witnesses:
ROSENDO ROUREN,
N. RUDKEN.